(12) United States Patent
Cavalaris et al.

(10) Patent No.: US 8,065,674 B2
(45) Date of Patent: Nov. 22, 2011

(54) PRIVILEGED USED CONTROL OF DEVICE INSTALLATION AND/OR AVAILABILITY

(75) Inventors: James G Cavalaris, Kirkland, WA (US); Jason T Cobb, Sammamish, WA (US); Santosh S Jodh, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1027 days.

(21) Appl. No.: 10/931,383

(22) Filed: Sep. 1, 2004

(65) Prior Publication Data
US 2006/0047859 A1 Mar. 2, 2006

(51) Int. Cl.
*G06F 9/445* (2006.01)
(52) U.S. Cl. ........ 717/174; 717/175; 717/178; 719/321; 719/322; 719/327; 710/8; 710/15; 710/20
(58) Field of Classification Search .......... 717/168–178; 719/321–327; 710/8–10; 709/220
See application file for complete search history.

(56) References Cited

U.S. PATENT DOCUMENTS

| | | | |
|---|---|---|---|
| 5,630,076 A * | 5/1997 | Saulpaugh et al. | 710/104 |
| 5,715,463 A * | 2/1998 | Merkin | 717/175 |
| 5,819,107 A * | 10/1998 | Lichtman et al. | 710/8 |
| 6,003,097 A | 12/1999 | Richman et al. | |
| 6,567,860 B1 * | 5/2003 | Maxwell et al. | 719/327 |
| 6,697,924 B2 | 2/2004 | Swank | |
| 6,748,461 B2 | 6/2004 | Oshins et al. | |
| 6,763,454 B2 | 7/2004 | Wilson et al. | |
| 6,950,964 B1 * | 9/2005 | McMichael et al. | 714/38 |
| 7,099,937 B1 * | 8/2006 | Ochiai et al. | 709/224 |
| 2003/0195951 A1 * | 10/2003 | Wittel et al. | 709/220 |
| 2004/0123305 A1 * | 6/2004 | Kim et al. | 719/321 |
| 2005/0034116 A1 * | 2/2005 | Rodriguez et al. | 717/174 |
| 2005/0160157 A1 * | 7/2005 | Collier et al. | 709/222 |
| 2005/0234824 A1 * | 10/2005 | Gill et al. | 705/50 |
| 2005/0283778 A1 * | 12/2005 | Barton | 717/174 |

OTHER PUBLICATIONS

The ten commandments of installing upgrade cards, Kirk Steers, PC World, May 1999, ProQuest Computing, pp. 274.*
Paging Dr. Asimov: Driver installation and the pitfalls of pre-positronic computing, Thompson, Brad, CD-ROM Professional; Oct 1996; ProQuest Computing, p. 82.*
M.M. Swift, B.N. Bershad, and H.M. Levy. Improving the Reliability of Commodity Operating Systems. Proceedings of the Nineteenth ACM Symposium on Operating Systems Principles, pp. 207-222, 2003.

* cited by examiner

*Primary Examiner* — Wei Zhen
*Assistant Examiner* — Satish Rampuria

(57) ABSTRACT

A system and method for entity management is provided. In accordance with an aspect of the present invention, a system administrator is given control over device(s) that can be installed on a computer system(s), and/or how the installation can be performed. Thus, a system administrator can specify device installation policy that prevents the computer system from automatically installing device(s) (e.g., even when an appropriate driver is available to be installed). For example, this policy can be applied to substantially all new devices and/or only a subset of devices. Optionally, policy can also control how device(s) that are already installed will be made available to the computer system.

26 Claims, 10 Drawing Sheets

PRIVILEGED USED CONTROL OF DEVICE INSTALLATION AND/OR AVAILABILITY

TECHNICAL FIELD

The present invention relates generally to computer systems, and, more particularly to management of device(s) installed on computer systems.

BACKGROUND OF THE INVENTION

In conventional computer systems, when a device (e.g., plug and play device) is discovered by the operating system, the operating system (e.g., a plug and play manager) automatically attempts device installation without user intervention. If the operating system provides default support for the device, or there is already a matching third-party driver for the device present on the computer system, the device will be automatically installed and immediately available to the user(s) of the computer system.

There are many scenarios with conventional computer system(s) where the large number and wide variety of devices, as well as the ease of installation that operating systems provide, is a liability to the administrators of those computer systems. Device installation has been very successful at making any device that can be supported by the computer system work when discovered, at the expense of not providing adequate support for system administrators to control that experience.

This mechanism effectively allows any user with physical access to the computer system to plug in a wide range of hardware devices and access them without requiring special administrative privileges. However, in many scenarios, this behavior can be undesirable.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides for systems and methods facilitating entity management. In accordance with an aspect of the present invention, a trusted and/or privileged user is given control over entities (e.g., device(s)) that can be installed on a computer system(s), and/or how the installation can be performed. Thus, a trusted and/or privileged user can specify device installation policy that prevents the computer system from automatically installing a driver for device(s) (e.g., even when an appropriate driver is available to be installed). For example, this policy can be applied to driver(s) for substantially all new devices and/or only a subset of devices. Optionally, policy can also control how device driver(s) that are already installed are made available to the computer system.

Accordingly, aspects of the present invention provide for definition of a policy (e.g., by a trusted user and/or privileged user, such as a system administrator) that:

Restricts device(s) from being installed automatically by the system;
Specifies criteria describing the set of device(s) that are permitted to be installed automatically by the system, or by a trusted and/or privileged user (e.g., device installation permitted list);
Specifies criteria describing the set of device(s) that are restricted from being installed automatically by the system, or by a trusted and/or privileged user (e.g., device installation restricted list);
Controls how user(s) are notified of new hardware discovered by the system which requires user interaction before installation can be completed;
Specifies criteria describing the set of device(s) that are already installed, but are restricted from being made available for use (e.g., started);
Provide feedback to user(s) about why a device was not installed or started by the system.

In accordance with an aspect of the present invention, an entity management system is provided. The system includes a device installation component having an installation component, and a policy data store.

The installation component controls installation of device driver(s) based, at least in part, upon information stored in the policy data store. In one example, the policy data store includes information associated with device(s) that are permitted to be installed on the computer system (e.g., permitted list) and/or specifies a set of criteria for device(s) that dynamically establishes membership in a permitted list. In another example, the policy data store includes information associated with device(s) that are not permitted to be installed on the computer system (e.g., restricted list) and/or specifies a set of criteria for device(s) that dynamically establishes membership in a restricted list.

For example, when a device is discovered by the system, the installation component can receive information associated with the device (e.g., device descriptor and/or identifier). Based, at least in part, upon the information received from the device, the installation component can review information stored in the policy data store to determine whether the installation should proceed. If the device is permitted to be installed (e.g., specifically included on permitted device list and/or not included on restricted device list), installation of a device driver associated with the device continues; otherwise, a device driver associated with the device is not installed (e.g., installation aborts). Device installation policy can further be based, for example, upon device attribute(s) and/or property(ies) such as, but not limited to, removable device capability, category and/or class of the driver to be installed, and/or restricted device extensibility point.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
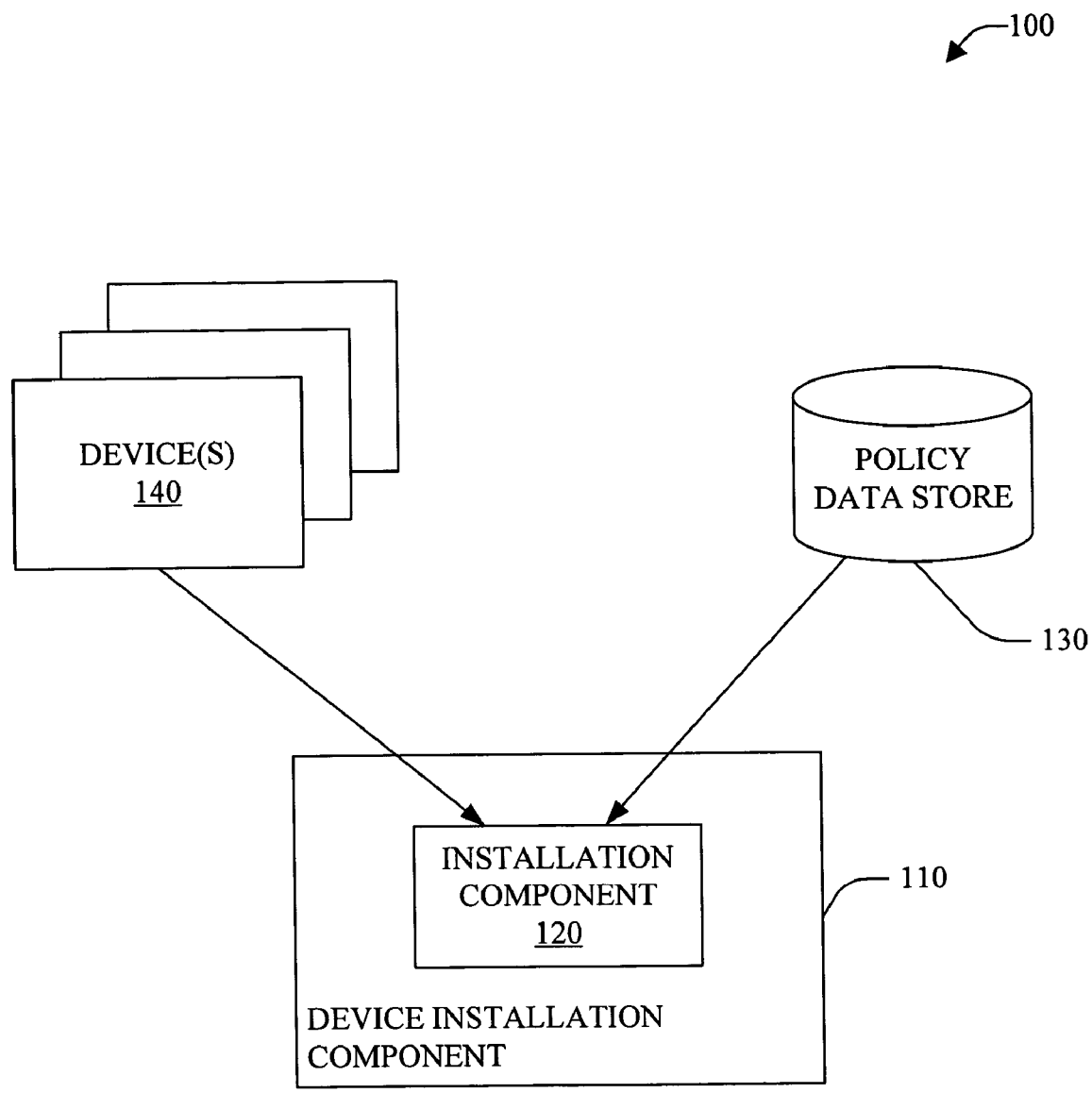
FIG. 1 is a block diagram of an entity management system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory) and secure digital memory device in accordance with the present invention.

As used in this application "entity" includes physical, logical and/or virtual device(s) (e.g., hardware, firmware and/or software). Additionally, "trusted context device installation" refers to device installation performed automatically by the operating system (e.g., plug and play service). Trusted context device installation is possible when a new device matches against a driver package that is available to the system, is sufficiently trusted, and can be installed for the current device with no user-interaction. "System administrator" refers to an entity that defines policy on the system. A "trusted and/or privileged user" is an entity that is entitled to install device(s) and/or driver(s) on the system. Finally, "user-initiated device installation" refers to device installation initiated in the context of an interactive user who is permitted to install device(s) (e.g., trusted and/or privileged user). User-initiated device installation is initiated automatically when the new device cannot be installed using the trusted-context installation mechanism. User-initiated device installation can also be initiated directly by any trusted and/or privileged user permitted to install device(s) on the system.

As noted previously, there are many scenarios with conventional computer system(s) where the large number and wide variety of devices, as well as the ease of installation that operating systems provide, is a liability to the administrators of those computer systems. In conventional computer systems, when a device (e.g., plug and play device) is discovered by the operating system (e.g., a device installation component) automatically attempts stand-alone device installation. If the operating system provides default support for the device, or there is already a matching third-party driver for the device present on the computer system, the device will be automatically installed and immediately available to user(s) of the computer system.

This mechanism effectively allows any user with physical access to the computer system to plug in a wide range of hardware devices and access it without requiring any special privileges. In many scenarios, this behavior can be undesirable.

The present invention allows for a system administrator to define system policy that restricts certain device(s) from being installed, even if the operating system is otherwise capable of providing support for the device. Alternatively, a system administrator is able to specify that only certain device(s) can be installed in the computer system.

Referring to FIG. 1, an entity management system 100 in accordance with an aspect of the present invention is illustrated. The system 100 includes a device installation component 110 having an installation component 120, and a policy data store 130.

In conventional systems, when a new device is added to the operating system, the operating system (e.g., a device installation component) first attempts to install the device without user intervention, using any device drivers that are already available on the computer system which describe themselves as a "match" for that device. If no matching driver(s) are present, the operating system (e.g., device installation component) prompts the current user to provide the device driver (s) at that time, and completes the installation. B2

This behavior can be acceptable, and even preferred, in a standalone environment (e.g., home environment). However, the ability to indiscriminately install device(s) can be undesirable in controlled computing environments, where the system or domain administrator(s) desire to restrict the ability for device(s) to be dynamically introduced to the computer system. For example, in a bank, it can be highly undesirable for a user to be able to introduce removable storage device(s) and/or printer(s) to the computer system, which could be used to transfer sensitive financial information off of the computer system. With conventional computer system(s), system administrators are generally unable to disable the operating system's behavior of aggressively installing new device(s) that can be supported by the computer system. Instead, system administrator(s) have resorted to haphazard and unsupported approaches, such as modifying the supported configuration to remove unwanted device driver(s).

The system 100 thus allows for privileged user control (e.g., by a trusted user) over which device(s), if any, are permitted to be installed on a computer system. Optionally, a system administrator can control how the installation can be performed. Thus, the system 100 addresses scenario(s) where a system administrator desires precise control over the set of device(s) that will be supported within their environment, regardless of the level of support that could potentially be provided by the computer system.

In one example, a system administrator can specify machine policy that prevents the computer system from automatically installing device(s), even when an appropriate driver is available to be installed. For example, this policy can be applied to substantially all new device(s) and/or only a subset of device(s). Optionally, this policy can also control how devices that are already installed are made available to the computer system.

In accordance with an aspect of the present invention, the installation component 120 controls installation of device driver(s) based, at least in part, upon information stored in the policy data store 130. In one example, the policy data store 130 includes information associated with device(s) that are permitted to be installed on the computer system (e.g., permitted list) and/or specifies a set of criteria for device(s) that dynamically establishes membership in a permitted list. In another example, the policy data store 130 includes information associated with device(s) that are not permitted to be installed on the computer system (e.g., restricted list) and/or specifies a set of criteria for device(s) that dynamically establishes membership in a restricted list.

For example, when a device 140 is added to the system, the installation component 120 can receive information associated with the device 140 (e.g., device descriptor and/or identifier). Based, at least in part, upon the information received from the device 140, the installation component 120 can review information stored in the policy data store 130 to determine whether the installation should proceed. If the device 140 is permitted to be installed (e.g., specifically included on permitted device list and/or not included on restricted device list), installation of a device driver associated with the device 140 continues; otherwise, a device driver associated with the device 140 is not installed (e.g., installation fails).

Device Attribute(s) and/or Property(ies)

In one example, the system 100 supports the use of different device attribute(s) and/or properties to describe device(s) affected by installation policy. For each attribute and/or property used to describe a device, separate restricted list and/or permitted list policy setting(s) can be stored in the policy data store 130.

Device(s) 140 can be explicitly allowed or restricted from being installed based on a set of hardware identifier(s) and/or compatible identifier(s) that have been reported for the device 140 by an enumerating bus driver. For example:

InstallDevices=DeviceId1, DeviceId2, DeviceId3
NoInstallDevices=DeviceId4, DeviceId5

Identifier(s) reported for the device 140 can be compared (e.g., in the order reported) against the list(s) for permitted and/or restricted device(s) stored in the policy data store 130. If a match is found, the appropriate policy is applied. If no match is found, other policy settings can continue to be checked.

In one example, when checking the corresponding permitted list and restricted list entries, preference is given to the permitted list settings. If a device is found to be a match in the permitted list of allowed devices, installation is allowed, regardless of whether the device also exists in the restricted list setting of restricted devices. In another example, the restricted list entries are given preference over the permitted list entries.

Policy can further be based, at least in part, upon attributes and/or properties of device(s) 140.

Removable Device Capability

For example, device(s) 140 can be explicitly allowed or restricted from being installed based on whether the "removable" device capability has been reported for the device 140 by the enumerating bus driver at the time the device 140 is to be installed and/or upgraded (e.g., NoInstallRemovableDevices=[true|false]). In one example, if the device is not restricted, any remaining policy setting(s) are checked.

Device Setup Class and/or Category

In another example, device(s) can be explicitly allowed and/or restricted from being installed based on the device setup class and/or category of an installation package that contains the driver node which best matches the device, as determined, for example, by a plug and play driver ranking algorithm. If a match is found, the appropriate policy is applied. If no match is found, other policy settings are continued to be checked.

InstallSetupClasses={Class1}, {Class2}, {Class3}
NoInstallSetupClasses={Class4}, {Class5}

As described previously, in one example, the permitted list setting for allowed device setup classes is checked for a match before the restricted list is consulted. In this example, if a device setup class is explicitly allowed, it cannot be rejected.

Restricted Device Extensibility Point

In addition to restricting devices based on their characteristics, the system 100 can support the ability to restrict devices based on their location in a plug and play device tree. A property can be set for specific device instances in the tree that would restrict any child devices from being installed.

DeviceInstance1
NoInstallChildren=[true|false]

If the device is not restricted, any remaining policy settings are checked.

Thus, installation of a new device can be restricted or allowed based on its location in the device tree. For example, this mechanism can be used to restrict only the installation of new devices that are enumerated from a bus device that is known to be unsecured, yet allow installation of new devices attached to other bus devices.

This aspect of the present invention facilitates system flexibility. For example, restricting the installation of all new devices can be an unnecessary support issue when replacing critical devices that are attached to bus devices that are known to be contained entirely within a locked machine chassis. If a system administrator can secure physical access to an internal bus device, it is unnecessary for the operating system to prevent installation of any new devices enumerated from it. On the same computer system however, there can exist some externally accessible ports, for example, but not limited to, USB or 1394 ports capable of enumerating unsupported devices, such as a removable disk. Thus, in accordance with an aspect of the present invention, a system administrator can restrict the enumeration of any disk device(s) from the externally available USB and or 1394 bus devices while still allowing for the automatic installation of replacement or additional internal hard disks enumerated from a new or existing internal PCI SCSI adapter device.

Other Device Installation Rules

Those skilled in the art will recognize that other settings, properties, and/or attributes of a device 140 and/or settings, properties, and/or attributes of the installation package used to install a device 140 can be employed by policies of the system 100. For example, restrictions may be enforced against installing a device 140 for which the best matching installation package would set a specific property value for the device. In another example, the device driver manufacturer is employed as a restriction on installation of the device.

Exemplary Scenarios
  Lock Down
  In one example, a system administrator is able to define a static set of installed device(s) on a computer system via the system 100. Once the computer system has been installed, a system administrator can "lock down" the computer system such that no additional device(s) can be installed by specifying in the policy data store 130 that no additional device(s) are permitted to be installed. Thus, when a new device is discovered, the system 100 determines that the policy stored in the policy data store 130 prevents additional device(s) from being installed, thus the device installation component 110 does not attempt to install the device automatically, does not allow any user to install the device, and further ensures that the device is never started. In a financial institution, for example, users would not be able to install any devices that could potentially allow data to be transferred from the computer system, such as storage devices or printers.
  Set of Supported or Unsupported Device Types
  A system administrator can decide which types of devices are allowed to be installed and/or are excluded from being installed on managed desktops. When any new device is discovered, the system 100 evaluates whether the device is allowed (or restricted), and attempts (or denies) installation accordingly. For example, while a supported mouse device can be installed on a corporate workstation, game control devices can be explicitly disallowed.
  Configurable Installation Behavior
  Policy can determine whether an interactive user should be prompted to install new device(s) that could not be installed automatically by the system, or whether the system should leave those devices in an un-configured state until a user that is permitted to install device(s) initiates their installation. For example, if a system administrator generally intends to manually initiate installation of new devices, such administrator can disable the behavior to automatically prompt interactive users to install the new devices.
  Privileged User Approved Installation
  In this scenario, although substantially all devices that can potentially be supported by the computer system are permitted to be installed, the installation is performed by a user that is permitted to install device(s). The system does not automatically attempt to install any new devices itself. For example, although an operating system may provide in-box support for a user's digital camera, a trusted and/or privileged user is required to install it.
  Those skilled in the art will recognize that the scenarios described above are merely examples of policies can be implemented in accordance with aspects of the present invention. Further, the scenarios described above can be combined to enable more complex scenarios. Separate permitted and restricted lists may be maintained for trusted context and user-initiated device installation scenarios such that the policies for device sets and installation behavior (described above) may be combined to enable automatic installation by the system of some devices only, permit trusted and/or privileged users to install all other devices, yet not automatically prompt them when any such devices require installation.
  For example, on a server system managed by an IT Administrator, a new USB mouse or keyboard devices can be permitted to be installed automatically by the computer system (e.g., based on the device setup class and/or category membership of the best available driver match), even though a trusted and/or privileged user is required to install all new disk devices (e.g., based on the presence of the "gendisk" device id in the device Hardware or Compatible Ids properties). Even though a trusted and/or privileged user is permitted to interactively install a new disk device, no user would be prompted when such a device was discovered if the defined policy has disabled such prompts. The trusted and/or privileged user thus manually initiates the installation of any new disk device.

It is to be appreciated that the system 100, the device installation component 110, the installation component 120, the policy data store 130 and/or the device(s) 140 can be computer components as that term is defined herein.

Figure 2:
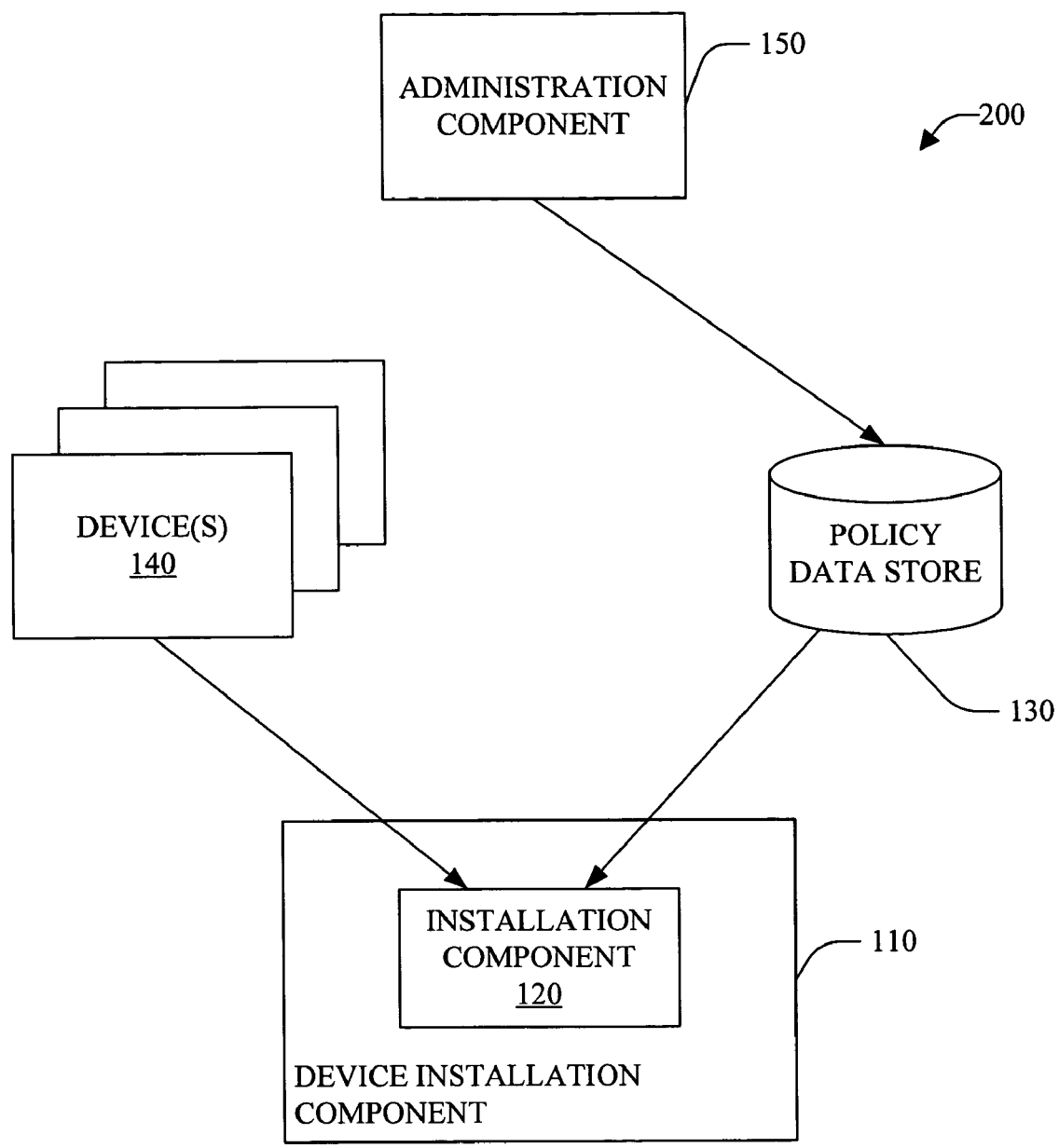
FIG. 2 is a block diagram of an entity management system in accordance with an aspect of the present invention.

Turning to FIG. 2, an entity management system 200 can include a device installation component 110 having an installation component 120, a policy data store 130, and an administration component 150.

The administration component 150 facilitates population of the policy data store 130. For example, the administration component 150 can be employed by a user with sufficient privileges to store information associated with device(s) that are permitted to be installed on the computer system and/or that are not permitted to be installed on the computer system. Thus, in one example, the system 200 allows a system administrator to define a computer system policy that restricts certain device(s) from being installed, even if the operating system (e.g., device installation component 110) is otherwise capable of providing support for the device.

For example, the effective policy which determines whether a given device 140 will be installed can be based on a set of defined rules. In one example, the policy includes a single policy setting that allows for trusted context device installation to be enabled or disabled for all devices: Trusted Context Installation Enabled=[true|false]. In another example, a separate policy can allow user-initiated device installation to be enabled or disabled for all devices: User-initiated Installation Enabled=[true|false]. For example, each setting can be controlled independently, such that both user-initiated and trusted context device installation can be disabled to prevent the installation or upgrade of any device(s).

If user-initiated device installation is permitted, a separate setting can be used to determine whether interactive user(s) will automatically be prompted to initiate user-initiated installation of devices that have not been restricted, and for which a matching device driver was not found, for example: Prompt for User-initiated Installation=[true|false]. In this example, if interactive users are not to be prompted to complete the installation, the device will remain in its initial "not configured" state.

It is to be appreciated that the system 200 and/or the administration component 150 can be computer components as that term is defined herein.

Distributed Environment

Figure 3:
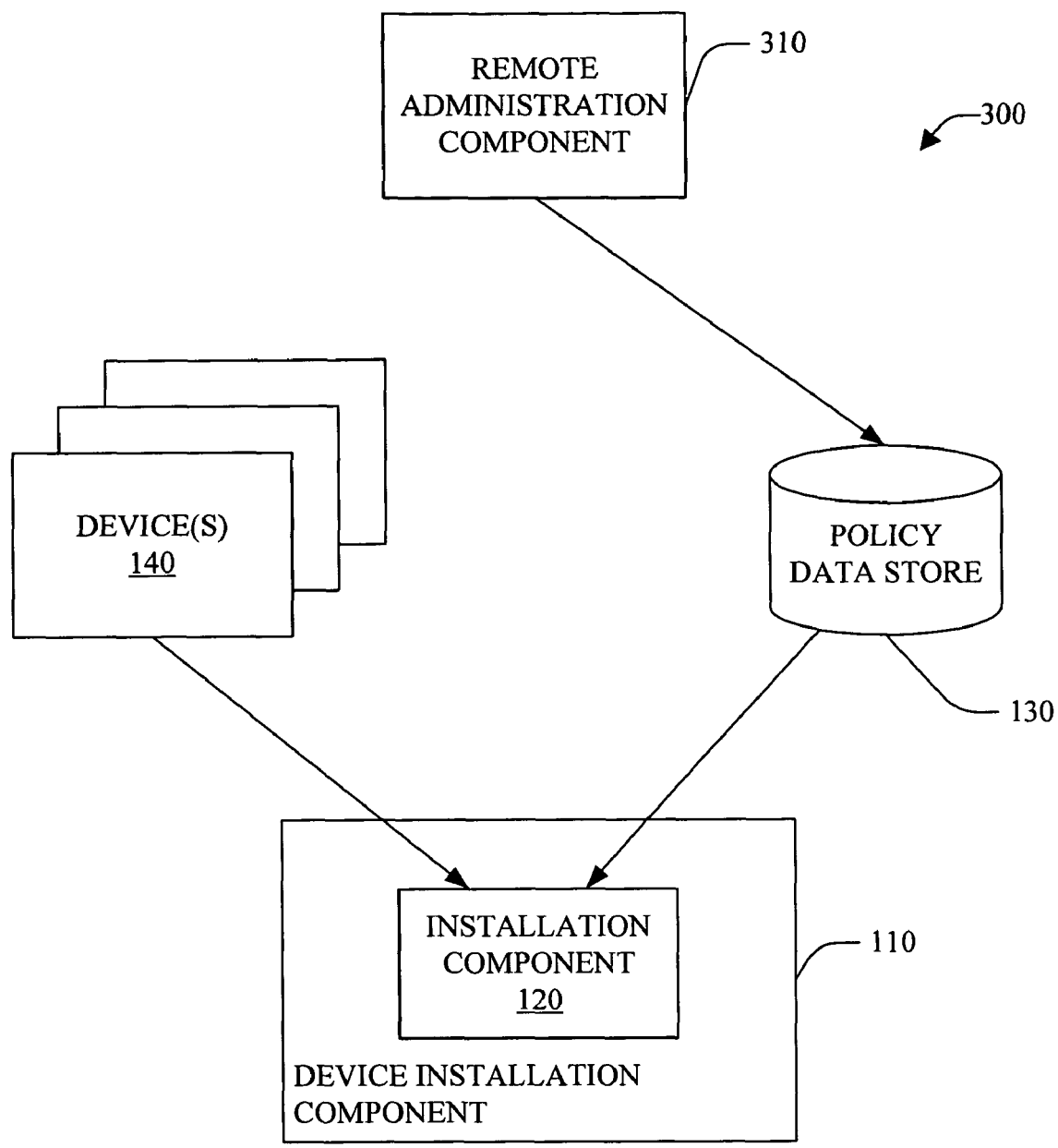
FIG. 3 is a block diagram of an entity management system in accordance with an aspect of the present invention.

Referring next to FIG. 3, an entity management system 300 in accordance with an aspect of the present invention is illustrated. The system 300 includes a device installation component 110 having an installation component 120. The system 300 further includes a policy data store 130 and a remote administration component 310.

The remote administration component 310 facilitates remote population of the policy data store 130. The remote administration component 310 can be coupled to the computer system, for example, via the Internet, an intranet and/or a network connection. The remote administration component 310 can be employed by a system administrator to store information associated with device(s) that are permitted to be installed on a computer system and/or that are not permitted to be installed on the computer system. Thus, in one example, the system 300 allows a system administrator to define a computer system policy that restricts certain device(s) from being installed, even if the operating system (e.g., device installation component 110) is otherwise capable of providing support for the device.

For example, an IT manager can create one or more policies for computer systems installed on a corporate network via the remote administration component 310. The IT manager can then store the policies in the policy data store 130 of one, some and/or substantially all of the individual computer systems that comprise the corporate network. In this manner, the IT manager is able to remotely administer device installation policy for individual computer system(s).

It is to be appreciated that the system 300 and/or the remote administration component 310 can be computer components as that term is defined herein.

Device Availability Policy

Figure 4:
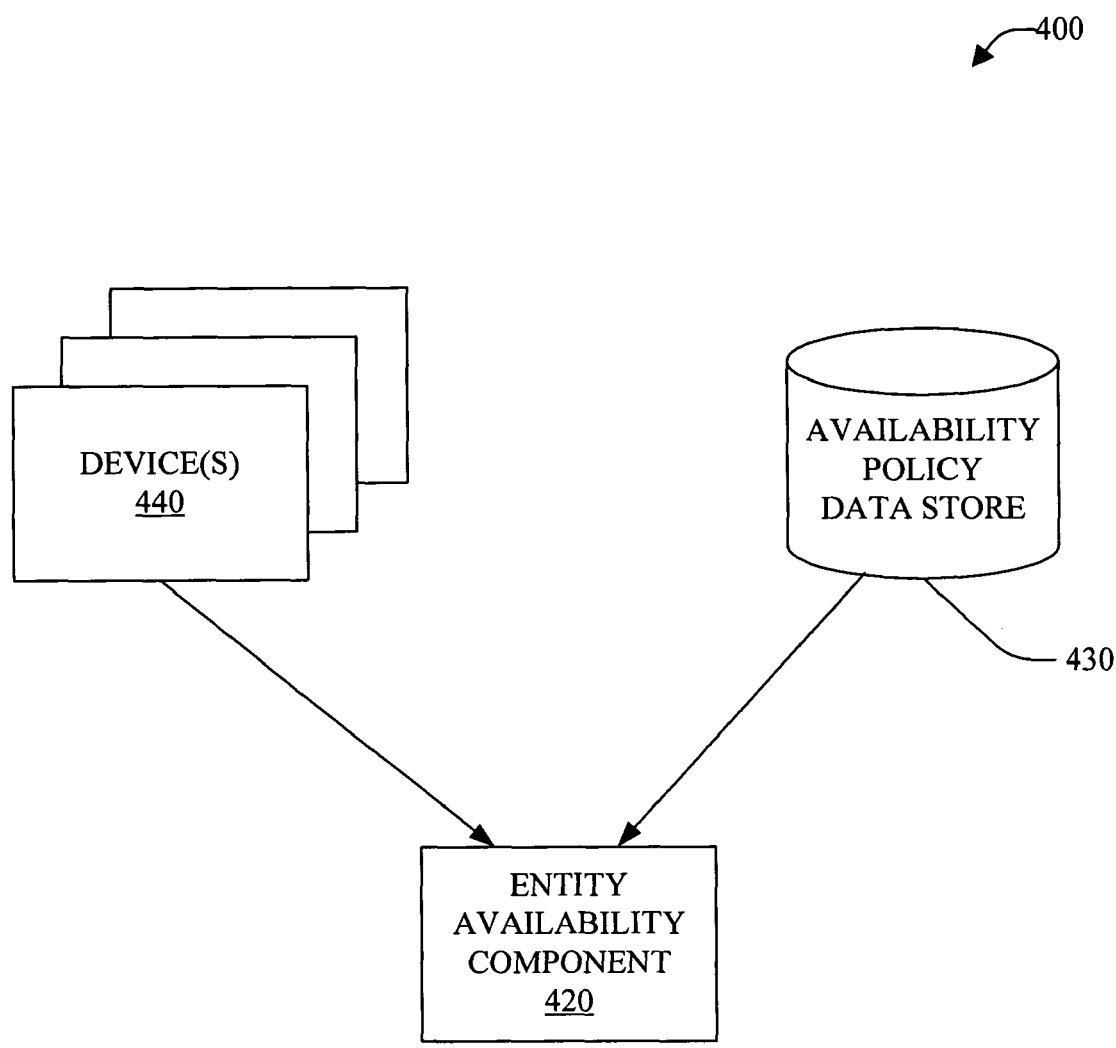
FIG. 4 is a block diagram of an entity management system in accordance with an aspect of the present invention.

Turning to FIG. 4, an entity management system 400 in accordance with an aspect of the present invention is illustrated. The system 400 includes an entity availability component 420, and an availability policy data store 430.

Information stored in the availability policy data store 430 can control how device(s) that are already installed are made available to the computer system. Thus, a policy can be set that prevents device(s) 440 from being recognized by the computer system altogether, regardless of whether they have already been installed or not. In one example, this policy can be applied to substantially any device 440 reported to the computer system. In this example, device availability policy can be maintained using separate, but similar setting(s) from those described above for device installation policy.

For example, device(s) 440 can be refused by the system based on their hardware identifier(s) and/or compatible identifier(s):

AvailableDevices=DeviceId1, DeviceId2, DeviceId3
UnavailableDevices=DeviceId4, DeviceId5

Device(s) 440 can also be refused based on their reported capabilities:

UnavailableRemovableDevices=[true|false]

When a device 440 is reported to the system, the entity availability component 420 can check existing device availability setting(s) against the attribute(s) of the device 440 that can be determined before the device 440 is to be started. If device availability policy settings reject the device 440, it is not made available to the computer system (e.g., and it is not started). For example, this can be accomplished by giving the device 440 a problem code which prevents it from being started, and cannot be programmatically cleared (e.g., by any user).

Even though some devices have been previously installed on the computer system, policy can be used to describe a set of device(s) that the system 400 should not make available for use (e.g., start). For example, even though an external USB mass-storage device has previously been installed for use on a computer system, current availability policy may indicate that no USB mass-storage device(s) should be started on the computer system. The device will be given a problem code by the entity availability component 420 that prevents the device from starting.

Optionally, device(s) 440 can be refused if enumerated off of a specific parent device 440. To accomplish this, a property can be associated with a specific instance of an installed device 440 that indicates that the system 400 should not start any child device(s) 440 attached to it. For example:

ChildDevicesUnavailable=[true|false]

In this example, when a device 440 is reported to the system 400, its parent is checked for this property. If the parent has the property set such that child device(s) 440 should be made unavailable, child device(s) 440 are refused by the system 400. Additionally, in this example, the parent device itself that has this policy set on it is not be affected by the policy.

Those skilled in the art will recognize that the information stored in the availability policy data store 430 can be based, at least in part, upon information stored by a system administrator (e.g., administration component) and/or remotely by a system administrator (e.g., remote administration component).

It is to be appreciated that the system 400, the entity availability component 420, the availability policy data store 430 and/or the device(s) 440 can be computer components as that term is defined herein.

Turning briefly to FIGS. 5-9, methodologies that may be implemented in accordance with the present invention are illustrated. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Figure 5:
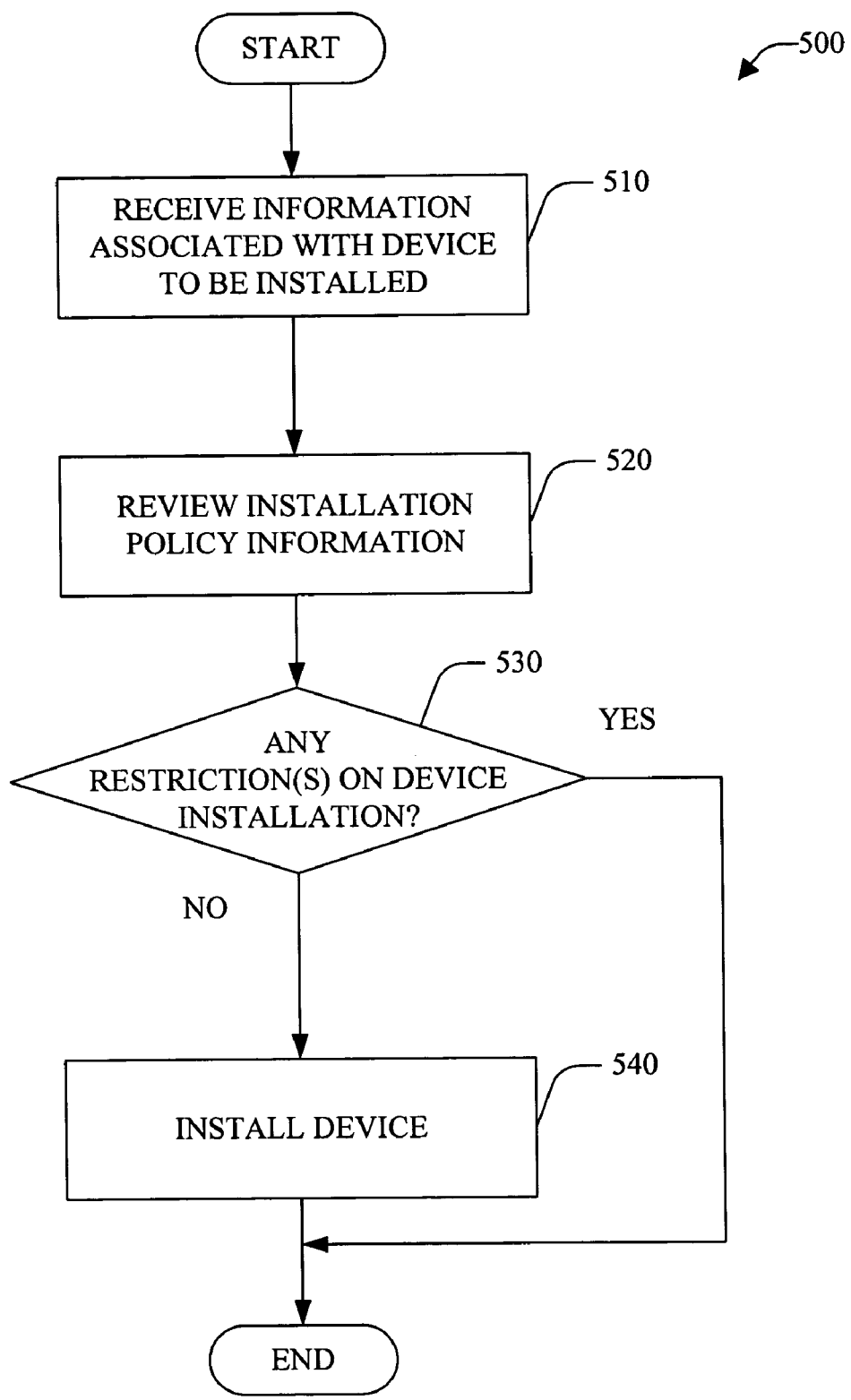
FIG. 5 is a flow chart of a method facilitating entity management in accordance with an aspect of the present invention.

Referring to FIG. 5, a method facilitating entity management 500 in accordance with an aspect of the present invention is illustrated. At 510, information associated with a device to be installed is received (e.g., hardware identifier(s) and/or compatible identifier(s)). At 520, installation policy information is reviewed (e.g., from a policy data store 130). At 530, a determination is made as to whether any restriction (s) have been placed on installation of the device. If the determination at 530 is YES, no further processing occurs. If the determination at 530 is NO, at 540, the device is installed.

Figure 6:
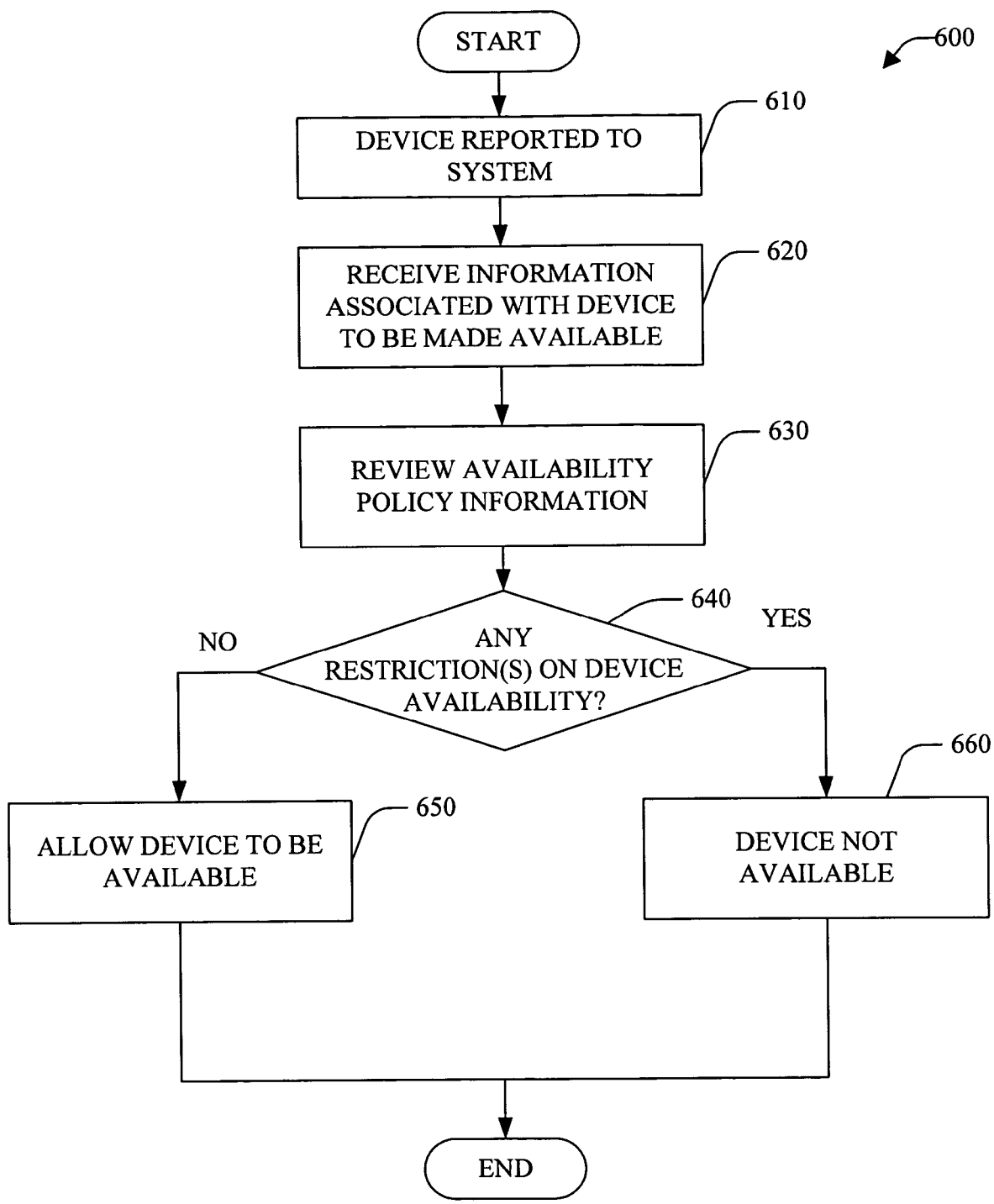
FIG. 6 is a flow chart of a method facilitating entity management in accordance with an aspect of the present invention.

Next, turning to FIG. 6, a method facilitating entity management 600 in accordance with an aspect of the present invention is illustrated. At 600, a device is reported to the system. At 620, information associated with the device to be made available is received. At 630, availability policy information is reviewed (e.g., from an availability policy data store 430).

At 640, a determination is made as to whether there are any restriction(s) on device availability. If the determination at 640 is NO, at 650, the device is allowed to be available (e.g., to user(s)), and, no further processing occurs. If the determination at 640 is YES, at 660, the device is made not available (e.g., by giving the device a problem code which prevents it from being started, and cannot be programmatically cleared).

Figure 7:
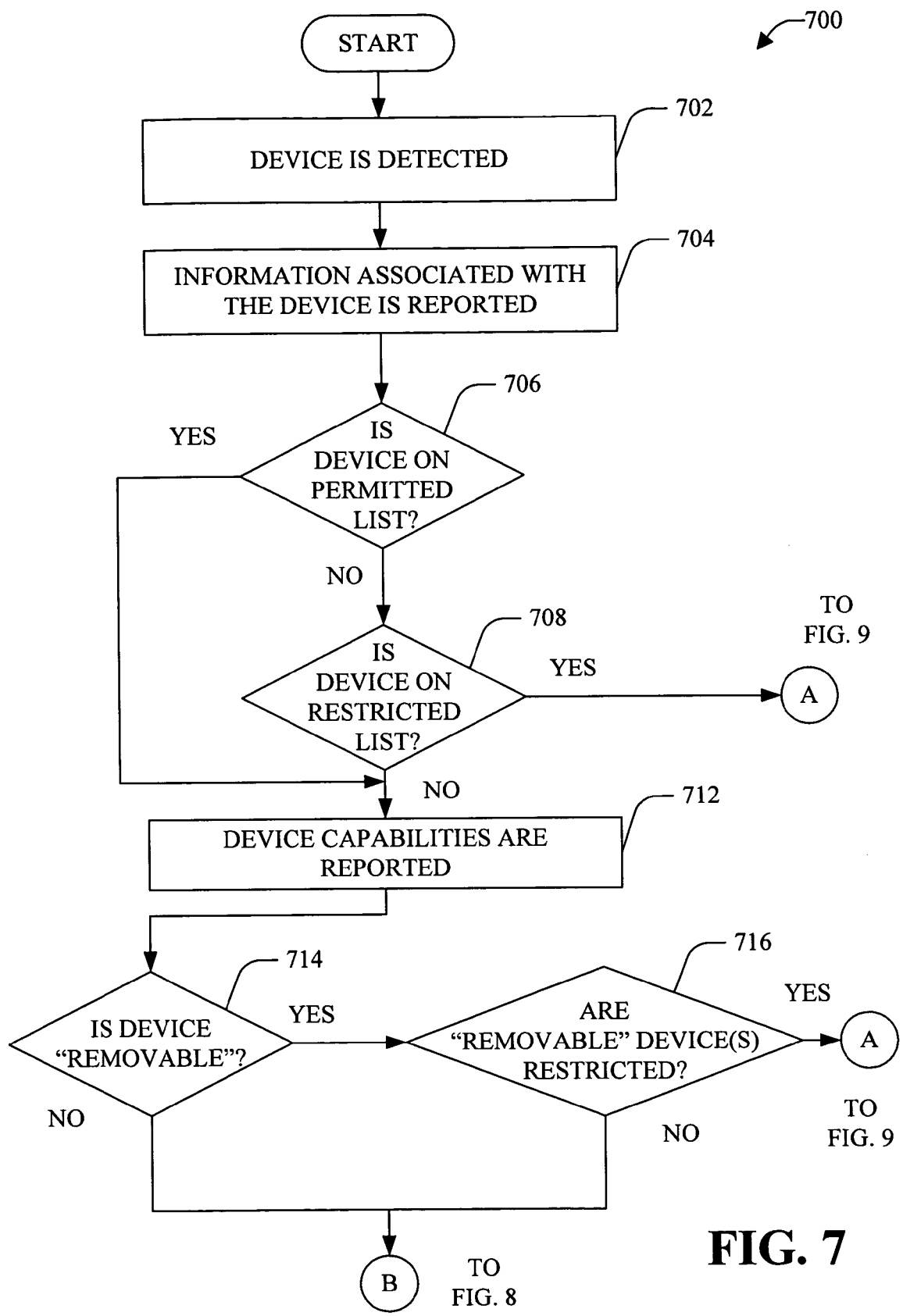
FIG. 7 is a flow chart of a method facilitating entity management in accordance with an aspect of the present invention.
Figure 8:
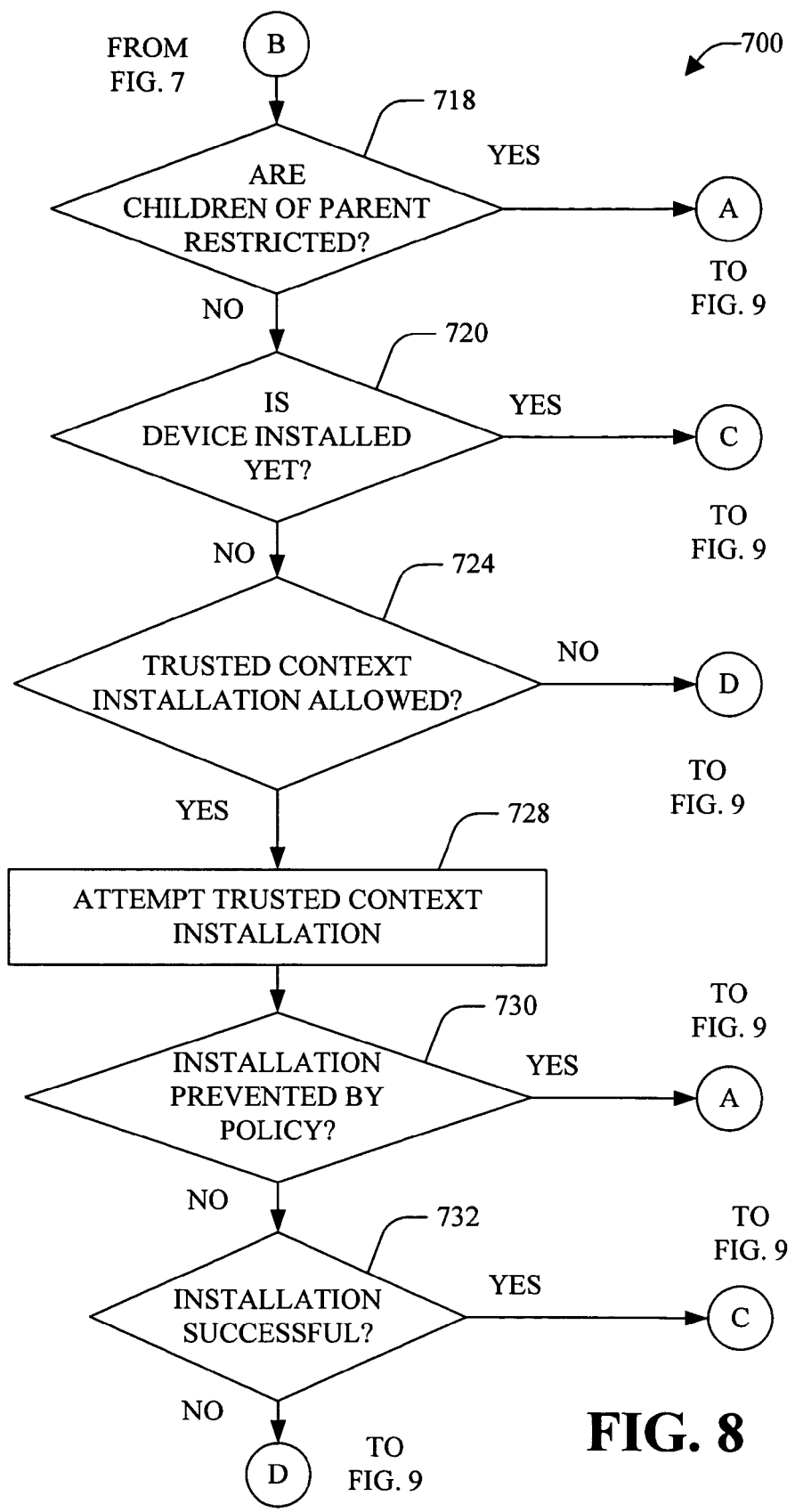
FIG. 8 is a flow chart further illustrating the method of FIG. 7.
Figure 9:
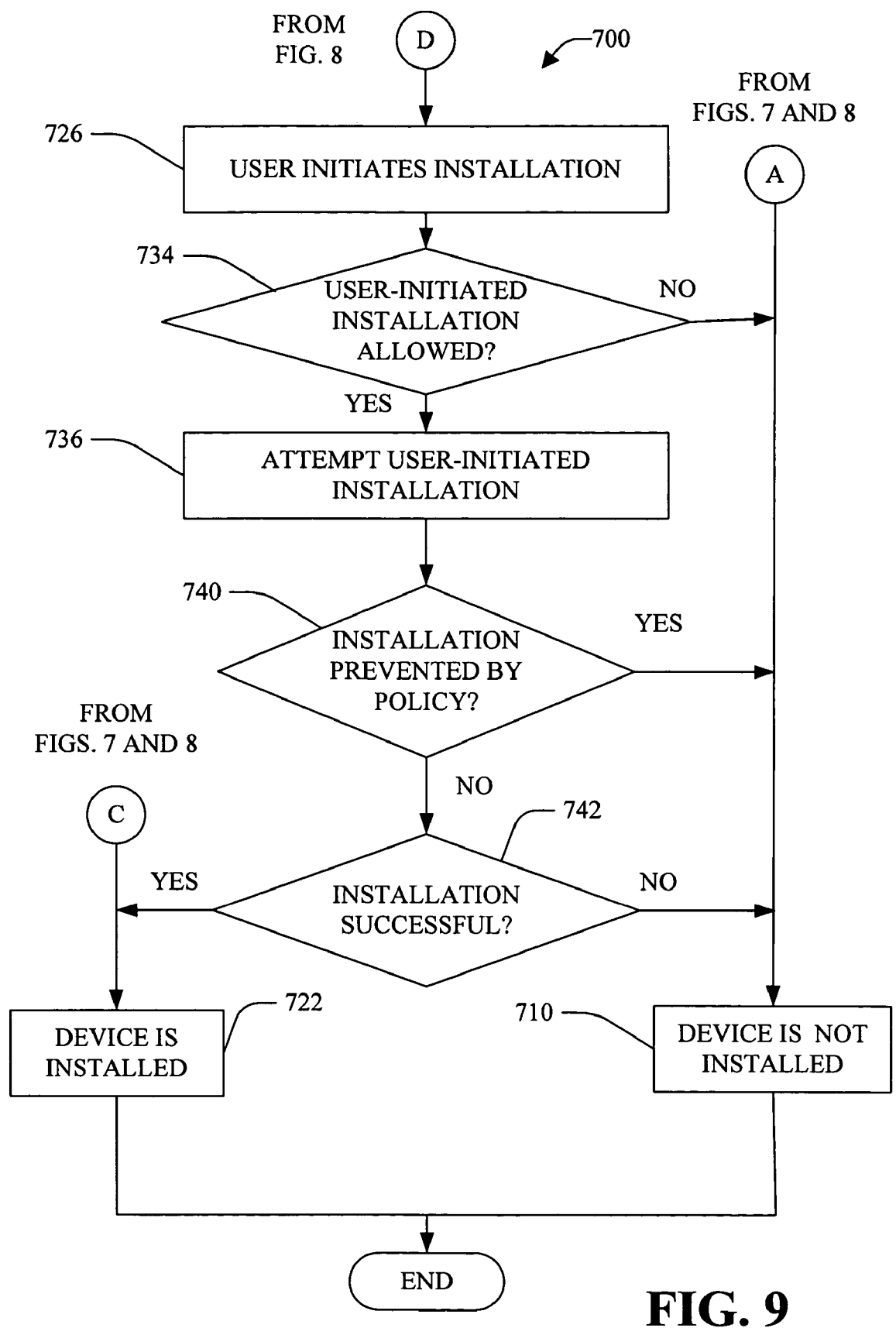
FIG. 9 is a flow chart further illustrating the method of FIGS. 7 and 8.

Turning next to FIGS. 7-9, a method facilitating entity management 700 in accordance with an aspect of the present invention is illustrated. At 702, a device is discovered. At 704, information associated with the device is reported (e.g., hardware identifier(s) and/or compatible identifier(s)).

At 706, a determination is made as to whether the device is on a permitted list. If the determination at 706 is NO, at 708, a determination is made as to whether the device is on a restricted list. If the determination at 708 is YES, processing continues at 710. If the determination at 708 is NO, processing continues at 712.

If the determination at 706 is YES, at 712, the device capabilities are reported. At 714, a determination is made as to whether the device is "removable". If the determination at 714 is YES, at 716, a determination is made as to whether "removable" device(s) are restricted. If the determination at 716 is YES, processing continues at 710. If the determination at 716 is NO, processing continues at 718.

If the determination at 714 is NO, at 718, a determination is made as to whether children of the parent device are restricted. If the determination at 718 is YES, processing continues at 710. If the determination at 718 is NO, at 720, a determination is made as to whether the device is already installed. If the determination at 720 is YES, processing continues at 722.

If the determination at 720 is NO, at 724, a determination is made as to whether trusted context installation is allowed. If the determination at 724 is NO, processing continues at 726. If the determination at 724 is YES, at 728, trusted context installation is attempted.

Next, at 730, a determination is made as to whether the installation is prevented by policy. If the determination at 730 is YES, processing continues at 710. If the determination at 730 is NO, at 732, a determination is made as to whether the installation was successful. If the determination at 732 is YES processing continues at 722.

If the determination at 732 is NO, at 726, a user initiates installation. At 734, determination is made as to whether user-initiated installation is allowed. If the determination at 734 is NO, processing continues at 710. If the determination at 734 is YES, at 736, user-initiated installation is attempted.

At 740, a determination is made as to whether installation is prevented by policy. If the determination at 740 is YES, processing continues at 710. If the determination at 740 is NO, at 742, a determination is made as to whether installation was successful. If the determination at 742 is YES, at 722, the device is installed, and no further processing occurs. If the determination at 742 is NO, at 710, the device is not installed, and, no further processing occurs.

Figure 10:
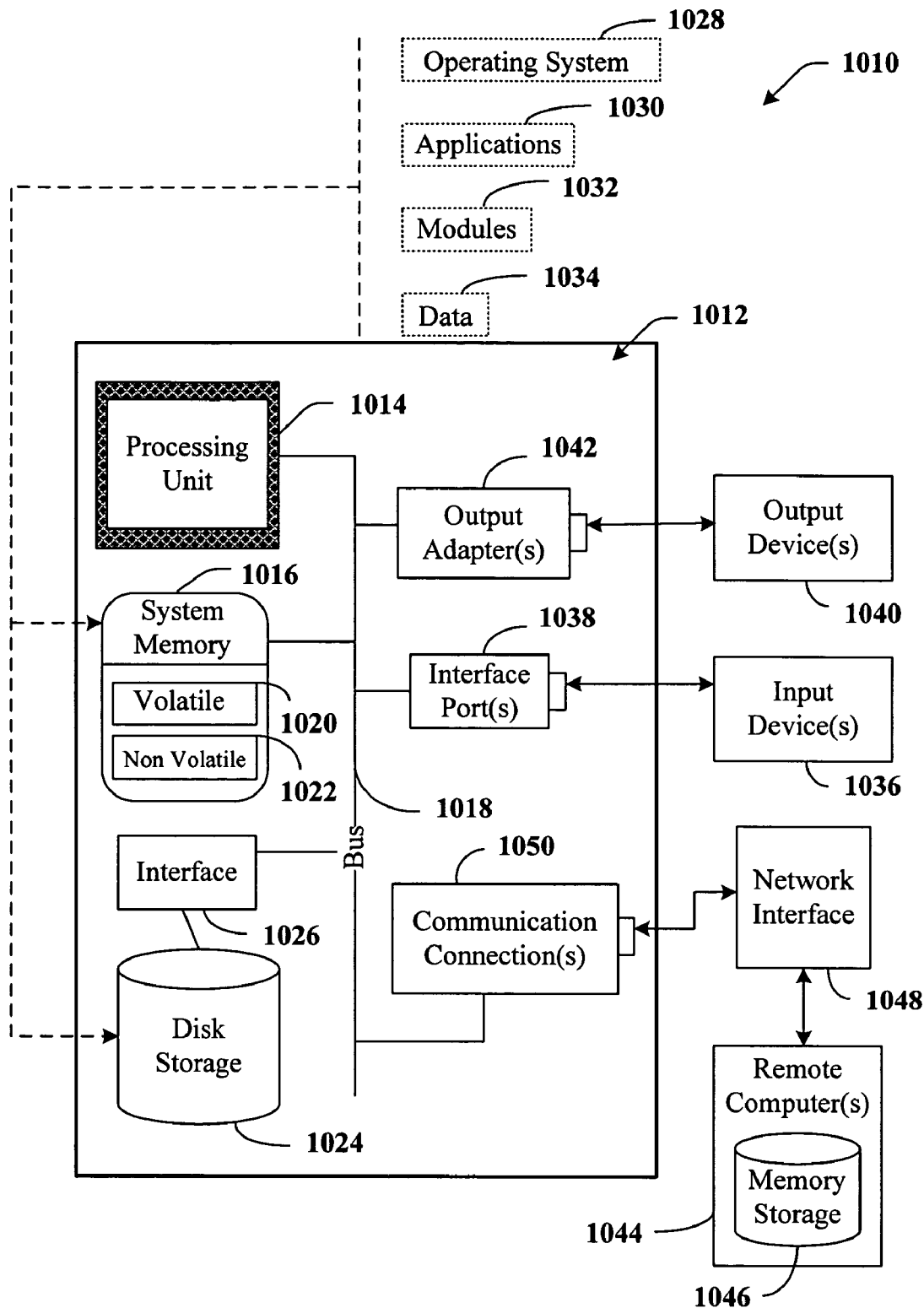
FIG. 10 illustrates an example operating environment in which the present invention may function.

In order to provide additional context for various aspects of the present invention, FIG. 10 and the following discussion are intended to provide a brief, general description of a suitable operating environment 1010 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software. Generally, however, program modules include routines, programs, objects, components, data structures, etc. that perform particular tasks or implement particular data types. The operating environment 1010 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 10, an exemplary environment 1010 for implementing various aspects of the invention includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multi-processor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/nonremovable, volatile/nonvolatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the present invention can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers among other output devices 1040 that require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented entity management system comprising the following computer-executable components stored in a memory:

a policy data store that stores device installation policy information, the device installation policy information comprising at least one of a permitted list specifying criteria identifying devices that are permitted to be installed on a computer system or a restricted list specifying criteria identifying devices that are not permitted to be installed on the computer system, the policy data store including separate device installation policy information for each of trusted context device installation and user-initiated device installation, wherein trusted context device installation allows non-restricted device drivers to be installed automatically without user interaction, and user-initiated device installation requires interaction from a privileged user in order to initiate installation of a non-restricted device driver; and a device installation component that:

makes a first determination of whether or not the device is identified as available, makes a second determination of whether or not a device is permitted to be installed based, at least in part, upon the device installation policy information stored in the policy data store, selectively installs the driver for the device based on the first and/or second determination, the selectively installing further comprising starting the device when it is determined the device is identified as available, and fails installation of the driver for the device when either it is determined the device is not permitted to be installed or it is determined that the device is identified as not available.

2. The system of claim 1, the permitted list comprising criteria associated with an attribute or property, or a combination thereof, associated with a device that is permitted to be installed on the computer system.

3. The system of claim 1, wherein devices satisfying the criteria specified in the permitted list are permitted to be installed on the computer system, and devices that satisfy the criteria specified in the restricted list and do not satisfy the criteria specified in the permitted list are prevented from being installed on the computer system.

4. The system of claim 1, the restricted list comprising criteria associated with an attribute or property, or a combination thereof, associated with a device that is restricted from being installed on a computer system.

5. The system of claim 1, the device installation policy information further comprising device criteria that must be satisfied by a device installed on the computer system before the device will be started.

6. The system of claim 1, the criteria specified by the device installation policy information including at least a device setup class or category, or a combination thereof, of a driver package.

7. The system of claim 1, the criteria specified by the device installation policy information, including at least the a device's location in a plug and play device tree.

8. The system of claim 7, the device installation policy information including a restriction on installation of a child device.

9. The system of claim 1, further comprising an administration component that facilitates population of the policy data store only by a privileged user.

10. The system of claim 1, the device installation policy information including a setting that allows trusted context device installation to be enabled or disabled, wherein enabling trusted context device installation allows non-restricted device drivers to be installed automatically without user interaction.

11. The system of claim 1, the device installation policy information including a setting that allows user-initiated device installation to be enabled or disabled, wherein enabling user-initiated device installation allows installation of non-restricted device drivers to be initiated only by a privileged user.

12. The system of claim 1, the policy data store receives device installation policy information from a remote administration component.

13. The system of claim 12, the remote administration component coupled to the system via at least one of the Internet, an intranet, or a network connection.

14. The system of claim 1, further comprising:
an availability policy data store that stores device availability policy information, the device availability policy information comprising device criteria that must be satisfied by a device installed on a computer system in order for the installed device to be made available for use by the computer system; and
an entity availability component that compares a property of the installed device to the policy information in the availability policy data store and, based at least in part on the comparison, determines availability of the installed device, wherein
the installed device has a driver installed therefor on the computer system.

15. A computer-implemented entity management system comprising the following computer executable components stored in a memory:
an availability policy data store that stores device availability policy information, the device availability policy information comprising device criteria that must be satisfied by a device installed on a computer system in order for the installed device to be made available for use by the computer system;
a policy data store that stores device installation policy information, the device installation policy information comprising at least one of a permitted list specifying criteria identifying devices that are permitted to be installed on a computer system or a restricted list specifying criteria identifying devices that are not permitted to be installed on the computer system, the policy data store including separate device installation policy information for each of trusted context device installation and user-initiated device installation, wherein trusted context device installation allows non-restricted device drivers to be installed automatically without user interaction, and user-initiated device installation requires interaction from a privileged user in order to initiate installation of a non-restricted device driver; and
an entity availability component that compares a property of the installed device to the policy information in the availability policy data store and, based at least in part on the comparison, prevents the installed device from being started when the availability policy information identifies the installed device as unavailable, wherein
the installed device has a driver installed therefor on the computer system.

16. The system of claim 15, the device criteria specifying at least a hardware identifier or compatible identifier, or a combination thereof, associated with a device such that installed devices not having the specified hardware identifier or compatible identifier are made unavailable for use by the computer system.

17. The system of claim 16, wherein a device is made unavailable for use by the computer system by giving the device a problem code which prevents the device from being started.

18. The system of claim 15, wherein a determination of whether to make the installed device available being based further, at least in part, upon whether a reported capability associated with the installed device is included in the device criteria specified by the device availability policy information.

19. The system of claim 15, wherein a determination of whether to make the installed device available being based further, at least in part, upon a setting associated with a parent device that restricts availability of any child devices attached to the parent device.

20. A method facilitating entity management comprising:
receiving input from a privileged user specifying a first set of device criteria identifying one or more devices that are permitted to be installed on a computer system;
receiving input from a privileged user specifying a second set of device criteria identifying one or more devices that are not permitted to be installed on a computer system;
receiving input from a privileged user specifying a third set of device criteria identifying separate device installation policy information for each of trusted context device installation and user-initiated device installation, wherein trusted context device installation allows non-restricted device drivers to be installed automatically without user interaction, and user-initiated device installation requires interaction from a privileged user in order to initiate installation of a non-restricted device driver
receiving information associated with a new device;
reviewing the first and second and third sets of device criteria given the received information;
determining whether a restriction on installation of the new device exists based on the review of the first and second sets of device criteria; and
selectively installing the device, the selectively installing comprising installing a driver for the device when no restriction exists on installation of the device and failing installation of the driver when a restriction exists on installation of the device.

21. The method of claim 20, determining whether a restriction on installation of the new device comprising determining whether the device satisfies the second set of device criteria but does not satisfy the first set of device criteria.

22. A computer-readable medium manufacture having stored thereon computer executable instructions that when executed in one or more processors carry out the method of claim 20.

23. The method of claim 20, determining whether a restriction on installation of the new device exists comprising:
determining whether parent of the device has an associated attribute restricting installation of any child devices attached to the parent.

24. The method of claim 20, determining whether a restriction on installation of a device exists comprising:
determining whether the device is removable;
when it is determined that the device is removable, determining whether the second set of device criteria includes a restriction on removable devices; and
restricting installation of the device when it is determined that the second set of device criteria includes a restriction on removable devices.

25. A method facilitating entity management on a computer system, the method comprising:

receiving device installation policy information, the device installation policy information comprising at least one of a permitted list specifying criteria identifying devices that are permitted to be installed on a computer system or a restricted list specifying criteria identifying devices that are not permitted to be installed on the computer system, the device installation policy information further including separate device installation policy information for each of trusted context device installation and user-initiated device installation, wherein trusted context device installation allows non-restricted device drivers to be installed automatically without user interaction, and user-initiated device installation requires interaction from a privileged user in order to initiate installation of a non-restricted device driver;

receiving availability policy information associated with an installed device requested to be made available for use, the availability policy information specifying at least one device property for which a restriction is desired, the at least one device property comprising at least one of whether the device reports as removable, the device reports as a child device or the device reports as a USB mass storage device, wherein the installed device has a driver installed therefor on the computer system;

reviewing the availability policy information against reported properties of the installed device;

determining whether the reported properties of the installed device include the at least one device property specified in the availability policy information;

allowing the installed device to be available on the computer system based on the determining when the reported properties do not include the at least one device property specified in the availability policy information; and making the installed device unavailable based on the determining when the reported properties include the at least one device property specified in the availability policy information.

26. A computer-readable storage medium manufacture having stored thereon computer executable components of a computer-implemented entity management system the entity management system comprising:

a policy data store containing device installation policy information, the device installation policy information comprising at least a permitted list specifying criteria of devices that are permitted to be installed on a computer system and a restricted list specifying criteria of devices that are not permitted to be installed on the computer system, the policy information comprising at least one of removability, setup class and/or category and location in a plug and play device tree, the policy data store including separate device installation policy information for each of trusted context device installation and user-initiated device installation, wherein trusted context device installation allows non-restricted device drivers to be installed automatically without user interaction, and user-initiated device installation requires interaction from a privileged user in order to initiate installation of a non-restricted device driver;

a device installation component that determines whether or not to install a driver associated with a device based, at least in part, upon a comparison of properties and/or attributes of the device to the device installation policy information stored in the policy data store;

an availability policy data store that stores device availability policy information, the device availability policy information comprising device criteria identifying installed devices that are not to be made available for use by the computer system, and an entity availability component that controls availability of devices installed on the computer system based on the device availability policy information.

* * * * *